United States Patent [19]

Okimoto

[11] Patent Number: 4,633,844
[45] Date of Patent: Jan. 6, 1987

[54] IGNITION TIMING CONTROL FOR A SUPERCHARGED ENGINE

[75] Inventor: Haruo Okimoto, Hiroshima, Japan

[73] Assignee: Mazda Motor Corporation, Hiroshima, Japan

[21] Appl. No.: 738,463

[22] Filed: May 28, 1985

[30] Foreign Application Priority Data

May 30, 1984 [JP] Japan ............................. 59-109897

[51] Int. Cl.⁴ .......................... F02B 33/00; F02P 5/04
[52] U.S. Cl. .................................. 123/559; 123/406; 123/432; 123/564
[58] Field of Search ............. 123/559, 564, 432, 406; 60/611

[56] References Cited

U.S. PATENT DOCUMENTS 2,538,377  1/1951  Ostling .............................. 123/559
2,559,859  7/1951  Elliott ............................... 123/564
4,527,534  7/1985  Sakurai ............................. 123/432
4,541,381  9/1985  Sugiura ............................ 123/406

FOREIGN PATENT DOCUMENTS 55-137314  10/1980  Japan .

Primary Examiner—Douglas Hart
Attorney, Agent, or Firm—Fleit, Jacobson, Cohn & Price

[57] ABSTRACT

A supercharged engine having a supercharger which is operated only when the engine load is greater than a predetermined value. An ignition timing control device is provided for determining a basic ignition timing in accordance with the engine operating condition. The basic ignition timing is retarded by a predetermined value when a supercharging signal is produced for commencing the supercharging, and is gradually advanced to the basic ignition timing in a predetermined time period.

14 Claims, 6 Drawing Figures

IGNITION TIMING CONTROL FOR A SUPERCHARGED ENGINE

BACKGROUND OF THE INVENTION

1. Field of the Invention

The present invention relates to supercharged internal combustion engines and more particularly to control systems for supercharged engines. More specifically, the present invention pertains to ignition timing control means for supercharged engines.

2. Description of Prior Art

Conventionally, it has been known to control superchargers for supercharged engines so that they are operated when the engine loads are above a predetermined value. For that purpose, supercharging compressors may be driven by electric motors which are energized when the engine loads are above the predetermined value. Alternatively, the supercharging compressors may be driven by engine crankshafts through clutches which are engaged when the engine loads are above the predetermined value. An example of the latter type system is disclosed in U.S. Pat. application Ser. No. 414,861, now U.S. Pat. No. 4,527,534, assigned to the same assignee as the present invention. A similar system is also disclosed in Japanese patent disclosure No. 58-44216, disclosed for public inspection on Mar. 15, 1983. The proposed systems, however, have problems in that there is a possibility of engine knocking being produced at a transient period just after the supercharger operation is started. More specifically, in a supercharged engine it is conventional to have the ignition timing retarded as compared with a non-supercharged engine, or to provide an inter-cooler in the intake passage in order to avoid the danger of knocking. In the engine having the supercharger operated only during engine operation wherein the engine load is greater than a predetermined value, the most practical way of avoiding the danger of knocking is to retard the ignition timing when the supercharger is being operated. For that purpose, the engine may be provided with a control system responsive to an increase in the intake air temperature, due to the compression by the supercharger, for retarding the ignition timing. However, with this control, there may be a possibility that the control of the ignition timing be delayed when the supercharger operation is started. Therefore, there still is a risk of knocking being produced in the transient period wherein the supercharger operation is just started.

SUMMARY OF THE INVENTION

It is therefore an object of the present invention to provide an ignition timing control system of a supercharged engine wherein the supercharger is operated under an engine load greater than a predetermined value, the ignition timing control system being able to retard the ignition timing without delay when the supercharger operation is started.

Another object of the present invention is to provide means for preventing knocking in a supercharged engine wherein the supercharger is operated under an engine load greater than a predetermined value.

According to the present invention, the above and other objects can be accomplished by a supercharged engine including combustion chamber means, supercharging means for producing a supercharging pressure, means for introducing the supercharging pressure into said combustion chamber means under an engine load greater than a predetermined value, supercharging start signal generating means for generating a supercharging start signal when the engine load increases beyond the predetermined value and, ignition timing control means responsive to said supercharging start signal to retard ignition timing. The present invention can be applied to any type of engine wherein the supercharging pressure is introduced into the combustion chamber under an engine load greater than a predetermined value. It will be understood that, according to the present invention, the ignition timing can be retarded without delay as soon as the supercharger operation is started, so that the possibility of knocking can be substantially prevented.

The above and other objects and features of the present invention will become apparent from the following description of a preferred embodiment taking reference to the accompanying drawings.

DESCRIPTION OF THE PREFERRED EMBODIMENT

Figure 1A:
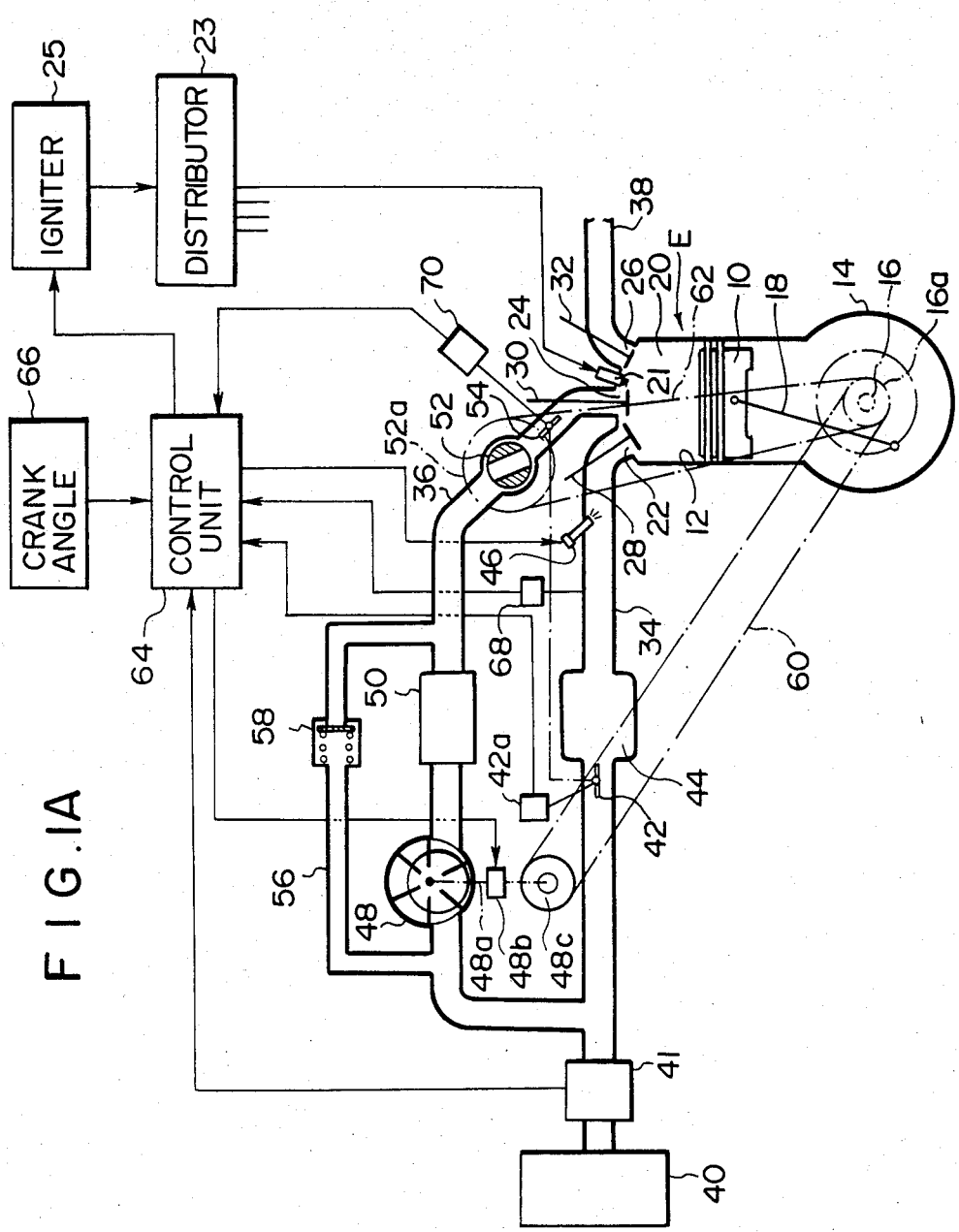
FIG. 1A is a diagrammatical illustration of a supercharged engine embodying the features of the present invention.

Referring to the drawings, particularly to FIG. 1A there is shown an engine E including a cylinder 12 and a piston 10 disposed in the cylinder 12 for reciprocating movements. Beneath the cylinder 12, there is a crankcase 14 in which a crankshaft 16 is provided. The crankshaft 16 is connected through a connecting rod 18 with the piston 10 so that the reciprocating movements of the piston 10 are converted into rotations of the crankshaft 16. In the upper portion of the cylinder 12, there is formed a combustion chamber 20 where two intake ports, namely, a main intake port 22 and an auxiliary intake port 24 are opened. An exhaust port 26 is also opened to the combustion chamber 20. The main intake port 22 is provided with a main intake valve 28, whereas the auxiliary intake port 24 is provided with an auxiliary intake valve 30. Similarly, the exhaust port 26 is provided with an exhaust valve 32.

The main intake port 22 is connected with a main intake passage 34 and the auxiliary intake port 24 is connected with an auxiliary intake passage 36. The exhaust port 26 is connected with an exhaust passage 38. An ignition plug 21 is provided to project into the combustion chamber 20. The ignition plug 21 is connected with a distributor 23 which is in turn connected with an ignitor 25 so that the ignition signals are applied at appropriate timings from the ignitor 25 to the ignition plug 21.

The main intake passage 34 is provided at the upstream end with an air-cleaner 40 and an airflowmeter 41, and a main throttle valve 42 and a surge tank 44 are provided in this order in the main intake passage 34 to constitute a main intake system. The main intake passage 34 is further provided at a position close to the combustion chamber 20 with a fuel injection valve 46. The auxiliary intake passage 36 is connected at the upstream end with the main intake passage 34 downstream of the airflowmeter 41. In the passage 36, there are provided a supercharger 48, an intercooler 50, a timing valve 52 and an auxiliary throttle valve 54, which are arranged in this order from the upstream side. There is further provided a relief passage 56 which is connected with the auxiliary intake passage 36 downstream of the intercooler 50 for relieving a part of the supercharging air to the upstream side of the supercharger 48. In the relief passage 56, there is provided a relief valve 58 which opens when the pressure downstream of the supercharger 48 exceeds a predetermined valve.

Figure 1B:
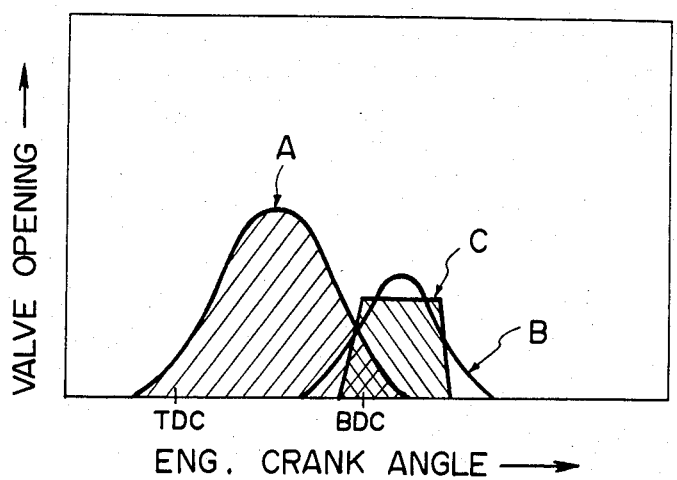
FIG. 1B is a diagram showing the valve timing property curves.

The supercharger 48 has a driving shaft 48a which is connected through an electromagnetic clutch 48b with a pulley 48c. A belt 60 is passed around the pulley 48c and a pulley 16a mounted on the crankshaft 16 so that the supercharger 48 is driven by the engine crankshaft 16 when the clutch 48b is engaged. The timing valve 52 is provided with a pulley 52a and a belt 62 is passed around the pulley 52a and the pulley 16a. Thus, the timing valve 52 is also driven by the engine crankshaft 16 synchronously with the rotation of the engine. The property curves A, B and C of the valve timing in FIG. 1B correspond to those of the main intake valve 28, the auxiliary intake valve 30 and the timing valve 52, respectively. As shown in FIG. 1B, the timing valve 52 opens the intake passage 36 at a final stage of the intake stroke. Consequently, the supercharging air is introduced into the combustion chamber 20 through the auxiliary intake passage 36, in addition to the natural intake air through the main intake passage 34, from the final stage of the intake stroke to the compression stroke in the supercharging zone in which the engine loads are above a predetermined value.

The auxiliary throttle valve 54 is interconnected with the main throttle valve 42 so that the auxiliary throttle valve 54 starts to open when the main throttle valve 42 is opened to a predetermined position. Preferably, the auxiliary throttle valve 54 starts to open when the engine load is increased to a value requiring supercharging. In the illustrated embodiment, there is provided a control unit 64 for controlling the operation of the ignition plug 21, the supercharger 48 and the fuel injection valve 46. The control unit 64 may be constituted by a microprocessor and receives an airflow signal from the airflowmeter 41 and a crank angle signal from a crank angle sensor 66. The control unit 64 further receives a throttle valve position signal from a position sensor 42a provided on the main throttle valve 42, an intake pressure signal from an intake pressure sensor 68 and a signal from a throttle valve switch 70, which is turned on when the auxiliary throttle valve 54 starts to open. The control unit 64 performs a calculation based on the input signals to judge the engine operating conditions and produces an output signal which is applied to the igniter 25 to energize the ignition plug 21 at appropriate timings in accordance with the engine operating conditions. The control unit 64 further produces an output which is applied to the clutch 48b to engage the same when it is judged that the engine operating condition requires operation of the supercharger 48.

Figure 2:
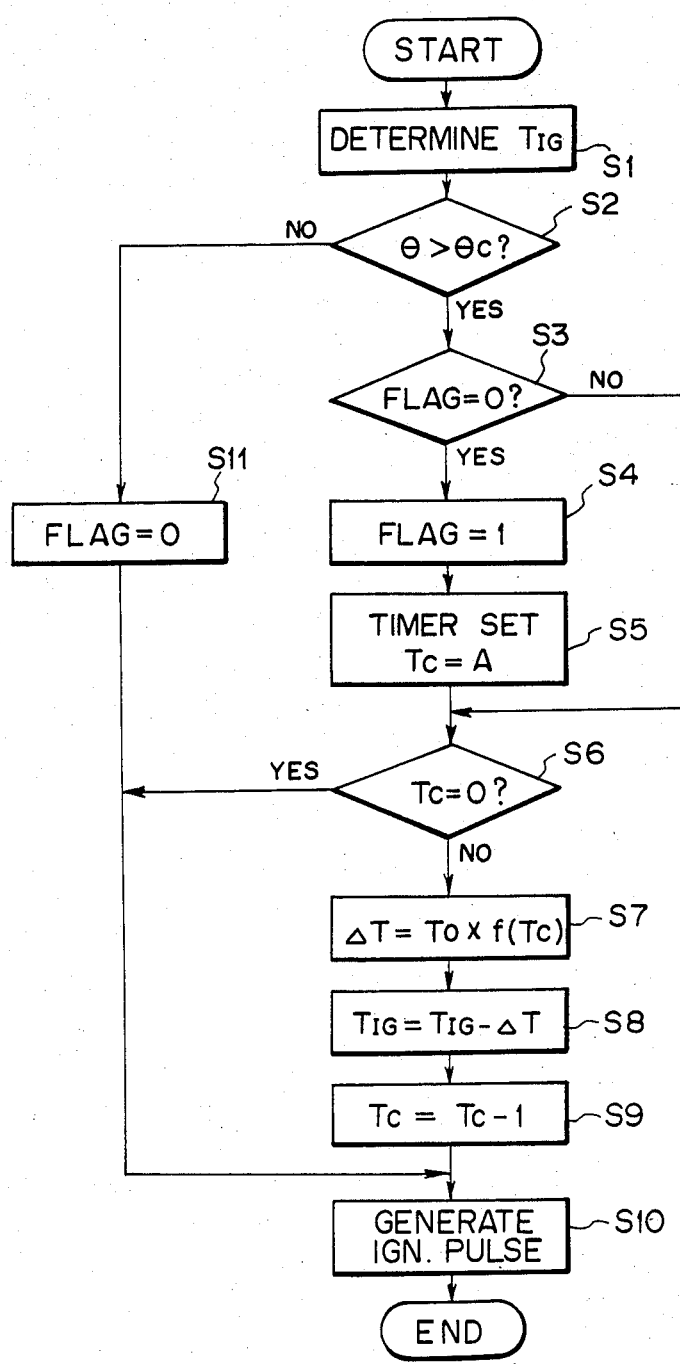
FIG. 2 is a flow chart showing the ignition timing control program in accordance with one embodiment of the present invention.

The ignition timing control will now be described taking reference to FIG. 2. When the engine is under steady state operation, the ignition timing $T_1G$ is determined in step $S_1$ in a conventional manner. For that purpose, a map may be provided for determining ignition timings corresponding to various engine operating conditions, and the control unit may read one of the ignition timings in the map in accordance with the actual engine operating condition. The igniter 25 produces a high voltage at a timing determined as described above.

The ignition timing $T_1G$ thus determined may be referred to as the basic timing, and the ignition signal is generated as long as the engine is under steady state operation, irrespective of whether or not the supercharger 48 is in operation. In step $S_2$, a judgement is made as to whether the opening $\theta$ of the main throttle valve 42 is larger than a predetermined angle $\theta_c$ in order to detect whether or not the engine load is above a predetermined value.

When it is judged that the opening $\theta$ of the main throttle valve 42 is larger than the predetermined value $\theta_c$, it is interpreted that the engine is in the supercharging zone and a supercharging signal is applied to the clutch 48b so that the supercharger 48 is operated. In the supercharging zone, it is required to judge as to when the engine operation has gone into the supercharging zone. For that purpose, a memory flag is provided and the flag is placed to 1 in the supercharging zone, but placed to 0 in the non-supercharging zone. Thus, in the step $S_3$, the position of the flag is read and when it is judged that the flag position is 0, it is interpreted that the engine operating condition has just gone into the supercharging zone and the flag is placed to 1 in step $S_4$ and a timer Tc is set to A in step $S_5$. Then, the timer is read as to whether the count Tc on the timer is 0 or not. When it is judged in the step $S_3$ that the flag position is not 0, the step $S_6$ is carried out.

Figure 3:
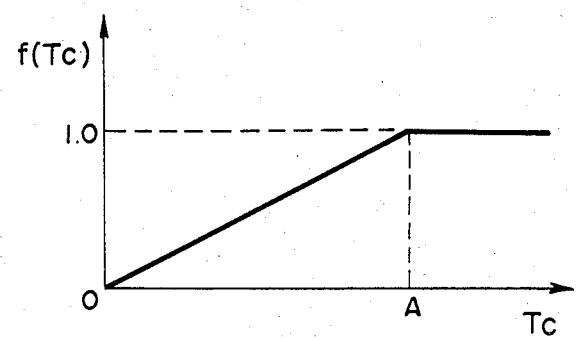
FIG. 3 is a diagram showing the relationship between the ignition timing modifying factor f(Tc) and the count Tc of the timer.

When it is judged in the step $S_6$ that the count Tc in the timer is not 0, a modifying value $\Delta T$ is calculated in step $S_7$ in accordance with a formula $\Delta T = T_o \times f(Tc)$. The function f(Tc) is determined as shown in FIG. 3 in accordance with the count Tc in the timer. Then, the ignition timing is modified in step $S_8$ in accordance with a formula $T_1G = T_1G - \Delta T$. Then, the count Tc is subtracted by one in step $S_9$ and the ignition pulse is produced in step $S_{10}$ at a timing as determined at step $S_8$. The operation is repeated until the count Tc in the timer becomes 0. When it is judged in step $S_6$ that the count Tc in the timer is 0, the ignition pulse is produced at the timing $T_1G$ without modification.

Figure 4A:
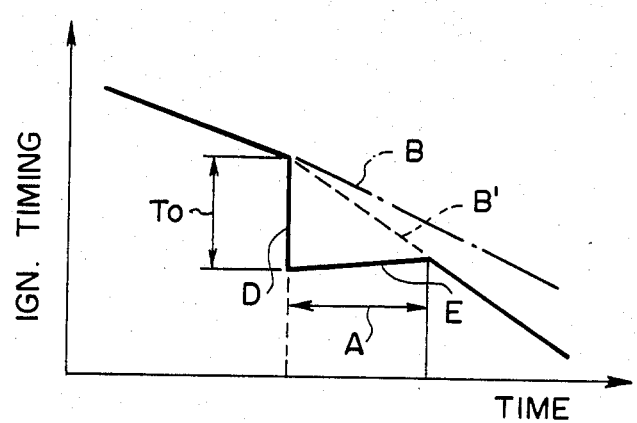
FIG. 4A is a diagram showing the relationship between the ignition timing and the time; and, FIG. 4B is a diagram showing the relationship between the throttle valve position and the time.
Figure 4B:
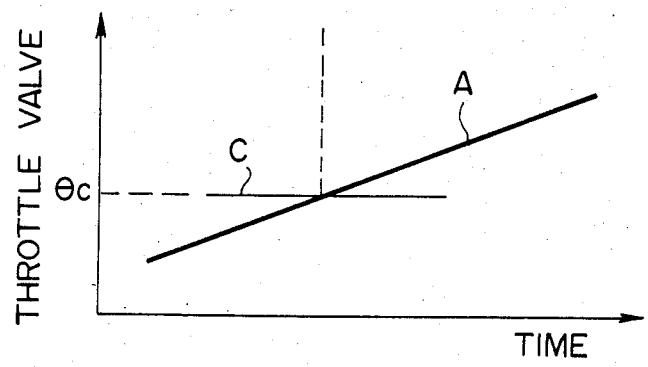

As described, the timer is set at first to the valve A in the step $S_5$, and as seen in FIG. 3 the modification factor f(Tc) is 1.0 when the count Tc in the timer is A so that the modifying value $\Delta T$ is equal to To. The modifying value $\Delta T$ is then gradually decreased as the time passes and finally becomes 0 when the count Tc in the timer becomes 0. It will be noted that, in a conventional engine having no supercharger, when the engine main throttle valve 42 is opened as shown by the solid line A in FIG. 4B, the ignition timing is retarded as in a conventional manner along the line B in FIG. 4A in response to an increase in the throttle opening of the main throttle valve 42. In the illustrated embodiment, however, when the opening of the main throttle valve 42 increases beyond the value where supercharging is to be started, as shown by a line C in FIG. 4B, the ignition timing is retarded by the value To as shown by a line D in FIG. 4A, and then is gradually returned as shown by a line E in FIG. 4A to an ignition timing for a supercharged engine, which is shown by a line B' in FIG. 4A, in the time period A. It is therefore possible to prevent danger to engine knocking in the transient period wherein supercharging is just started.

When the opening $\theta$ of the main throttle valve 42 is smaller than the valve $\theta_c$, the ignition pulse is produced at a timing without modification.

In the supercharger control described above, the clutch 48b for the supercharger 48 is engaged when the throttle valve 42 is opened to the angle $\theta_c$ where the supercharging is to be started. However, in order to ensure that a desired supercharging pressure be provided at the throttle valve opening $\theta_c$, the clutch 48b may be engaged at a throttle valve opening slightly smaller than the valve $\theta_c$. The supercharging operation is then started by having the auxiliary throttle valve 54 opened when the main throttle valve 42 is opened to the valve $\theta_c$.

The invention has thus been shown and described with reference to a specific embodiment. However, it should be noted that the invention is in no way limited to the details of the illustrated embodiment, but changes and modifications may be made without departing from the scope of the appended claims.

I claim:

1. A supercharged engine including combustion chamber means, supercharging means for producing a supercharging pressure, means for introducing the supercharging pressure into said combustion chamber means under an engine load greater than a predetermined value, supercharging start signal generating means for generating a supercharging start signal when the engine load increases beyond the predetermined value, and ignition timing control means responsive to said supercharging start signal to retard ignition timing, wherein said ignition timing control means includes means for retarding the ignition timing for a predetermined time period from an instant when the supercharging start signal is produced.

2. A supercharged engine including combustion chamber means, supercharging means for producing a supercharging pressure, means for introducing the supercharging pressure into said combustion chamber means under an engine load greater than a predetermined value, supercharging start signal generating means for generating a supercharging start signal when the engine load increases beyond the predetermined value, and ignition timing control means responsive to said supercharging start signal to retard ignition timing, wherein said ignition timing control means includes means for retarding the ignition timing by a predetermined value and gradually advancing in a predetermined time period the ignition timing to a value determined for an actual engine operating condition under supercharging.

3. A supercharged engine in accordance with claim 1 which includes drive means for connecting said supercharging means to an engine output shaft so that said supercharging means is driven by the engine output shaft.

4. A supercharged engine in accordance with claim 3 in which said drive means includes clutch means which is engaged under an engine load greater than said predetermined value.

5. A supercharged engine in accordance with claim 3 in which said drive means includes clutch means which is engaged when the supercharging start signal is received.

6. A supercharged engine including combustion chamber means, first intake passage means leading to said combustion chamber means for providing a supply of intake air, second intake passage means leading to said combustion chamber means, said second intake passage means introducing the supercharging air into the combustion chamber means in addition to said intake air from the first passage means at least in the compression stroke, supercharging means provided in said second intake passage means for providing a supply of supercharging air, supercharging control means for producing a supercharging signal under an engine load greater than a predetermined value so that the supercharging air is introduced under the engine load greater than the predetermined value, ignition timing control means for controlling ignition timing in accordance with engine operating conditions, said ignition timing control means including modifying means responsive to said supercharging signal for retarding said ignition timing, wherein said modifying means is means for retarding the ignition timing for a predetermined time period from an instant when the supercharging signal is produced.

7. A supercharged engine in accordance with claim 6 which includes valve means provided in said second intake passage means downstream of the supercharging means and, means for opening said valve means under an engine load greater than the predetermined value.

8. A supercharged engine including combustion chamber means, first intake passage means leading to said combustion chamber means for providing a supply of intake air, second intake passage means leading to said combustion chamber means, said second intake passage means introducing the supercharging air into the combustion chamber means in addition to said intake air from the first passage means at least in the compression stroke, supercharging means provided in said second intake passage means for providing a supply of supercharging air, supercharging control means for producing a supercharging signal under an engine load greater than a predetermined value so that the supercharging air is introduced under the engine load greater than the predetermined value, ignition timing control means for controlling ignition timing in accordance with engine operating conditions, said ignition timing control means including modifying means responsive to said supercharging signal for retarding said ignition timing, wherein said modifying means is means for retarding the ignition timing by a predetermined value when the supercharging signal is produced and gradually advancing in a predetermined time period the ignition timing to a value determined for an actual engine operating condition under supercharging.

9. A supercharged engine in accordance with claim 7 which includes throttle valve means provided in said first intake passage means, and said supercharging control means is means for producing the supercharging signal when said throttle valve means is opened beyond a predetermined value.

10. A supercharged engine in accordance with claim 9 in which said valve means in said second intake passage means is interconnected with said throttle valve means so as to be opened when said throttle valve means is opened beyond said predetermined value.

11. A supercharged engine in accordance with claim 6 which includes drive menas for connecting said supercharging means to an engine output shaft so that said supercharging means is driven by the engine output shaft.

12. A supercharged engine in accordance with claim 11 in which said drive means includes clutch means which is engaged when the supercharging signal is produced.

13. A supercharged engine in accordance with claim 11 in which said drive means includes clutch means which is engaged under an engine load greater than said predetermined value.

14. A supercharged engine in accordance with claim 7 in which said modifying means is means for retarding the ignition timing by a predetermined value when the supercharging signal is produced and gradually advancing in a predetermined time period the ignition timing to a value determined for an actual engine operating condition under supercharging said drive means including clutch means which is engaged when the supercharging signal is produced.

* * * * *